(12) United States Patent
Are et al.

(10) Patent No.: US 11,379,931 B2
(45) Date of Patent: Jul. 5, 2022

(54) PROJECTING TIME-TO-PAY OF HEALTHCARE INVOICES

(71) Applicant: CERNER INNOVATION, INC., Kansas City, KS (US)

(72) Inventors: Sasanka Are, Kansas City, MO (US); John Matthew Sugden, Lee's Summit, MO (US); Brian Thurston, Kansas City, KS (US)

(73) Assignee: CERNER INNOVATION, INC., Kansas City, KS (US)

( * ) Notice: Subject to any disclaimer, the term of this patent is extended or adjusted under 35 U.S.C. 154(b) by 831 days.

(21) Appl. No.: 15/896,296

(22) Filed: Feb. 14, 2018

(65) Prior Publication Data

US 2019/0205996 A1 Jul. 4, 2019

Related U.S. Application Data

(60) Provisional application No. 62/612,069, filed on Dec. 29, 2017.

(51) Int. Cl.
*G06Q 40/00* (2012.01)
*G06Q 10/10* (2012.01)
*G06Q 10/04* (2012.01)

(52) U.S. Cl.
CPC .......... *G06Q 40/125* (2013.12); *G06Q 10/04* (2013.01); *G06Q 10/10* (2013.01)

(58) Field of Classification Search
CPC combination set(s) only.
See application file for complete search history.

(56) References Cited

U.S. PATENT DOCUMENTS

| | | |
|---|---|---|
| 7,904,306 B2 * | 3/2011 | Johnson et al. |
| 2005/0165681 A1 * | 7/2005 | Heinemann et al. |
| 2010/0257074 A1 * | 10/2010 | Hendrickson |
| 2016/0078552 A1 * | 3/2016 | Mercer et al. |
| 2017/0017760 A1 * | 1/2017 | Freese et al. |
| 2017/0124631 A1 * | 5/2017 | Bhandari et al. |
| 2018/0107734 A1 * | 4/2018 | Galia et al. |

* cited by examiner

*Primary Examiner* — Michael Tomaszewski
*Assistant Examiner* — William T. Monticello
(74) *Attorney, Agent, or Firm* — Shook, Hardy & Bacon, LLP (57) ABSTRACT

Systems, methods and computer-readable media are provided for predicting probability of a clinical invoice being paid by a specified date. A clinical invoice is a request for payment. The clinical invoice can take the form of an insurance claim, bill to a person (e.g., self-insured, co-pay), or submission to a government entity (e.g., Medicare, Medicaid). Healthcare facilities do not know how long they will have to wait between submitting an invoice and receiving compensation from government, insurance, or other payers. The methods described herein can be used to estimate the probability of payment occurring by a specified date. This information can be used to triage outstanding claims for investigation and to improve outstanding cash forecasts. The technology described herein uses survival curves to estimate when an invoice will be paid.

16 Claims, 11 Drawing Sheets

PROJECTING TIME-TO-PAY OF HEALTHCARE INVOICES

CROSS-REFERENCE TO RELATED APPLICATIONS

This application claims the benefit of U.S. Provisional Application No. 62/612,069, filed Jan. 29, 2017, the entirety of which is hereby incorporated by reference.

BACKGROUND

Clinical facilities do not know how long they will have to wait between billing for services and receiving compensation from government, insurance, and personal payers. Once billed, the outstanding bill forms a clinical facility's accounts receivable. Difficulties understanding the timing of collecting accounts receivable causes inefficient deployment of collection resources and difficulty estimating cash flow.

SUMMARY

Systems, methods and computer-readable media are provided for predicting probability of a clinical invoice being paid by a specified date. A clinical invoice is a request for payment. The clinical invoice can take the form of an insurance claim, bill to a person (e.g., self-insured, co-pay), or submission to a government entity (e.g., Medicare, Medicaid). Healthcare facilities do not know how long they will have to wait between submitting an invoice and receiving compensation from government, insurance, or other payers. The methods described herein can be used to estimate the probability of payment occurring by a specified date. This information can be used to triage outstanding claims for investigation and to improve outstanding cash forecasts. The technology described herein uses survival curves to estimate when an invoice will be paid.

Accordingly, one aim of embodiments of this disclosure is to improve upon conventional industry practice by deriving accurate predictive capabilities to provide more effective collection efforts and financial management.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Systems, methods and computer-readable media are provided for predicting probability of a clinical invoice being paid by a specified date. A clinical invoice is a request for payment. The clinical invoice can take the form of an insurance claim, bill to a person (e.g., self-insured, co-pay), or submission to a government entity (e.g., Medicare, Medicaid). Healthcare facilities do not know how long they will have to wait between submitting an invoice and receiving compensation from government, insurance, or other payers. The methods described herein can be used to estimate the probability of payment occurring by a specified date. This information can be used to triage outstanding claims for investigation and to improve outstanding cash forecasts. The technology described herein uses survival curves to estimate when an invoice will be paid.

Survival analysis is a branch of statistical modeling used to estimate the probability of an event occurring by a specified date. In the present analysis, the event is payment of a medical invoice. The survival (e.g., non-payment) probability can be determined from a survival curve. The payment probability can be calculated by subtracting the survival probability from 1. For example, if five percent of invoices are paid in one week, then the survival probability could be 95%. The payment probability would be 5%.

In one aspect, the survival curves can be Kaplan-Meier curves, which are a non-parametric statistic used to estimate the survival function from lifetime data. In medical research, it is often used to measure the fraction of patients living for a certain amount of time after treatment.

The Kaplan-Meier curves allow a survival curve to be calculated using censored data. Because some invoices are not paid during the time studied (e.g., six months) these invoices are considered rightward censored. Other invoices that are not paid during the studied period can be intermittently censored. For example, an invoice may be canceled without payment received. The Kaplan-Meier curve is able to consider the censored data in its calculation of a payment probability.

As one skilled in the art will appreciate, embodiments of our invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer readable media, as discussed further with respect to FIGS. 1A-1B.

Figure 1A:
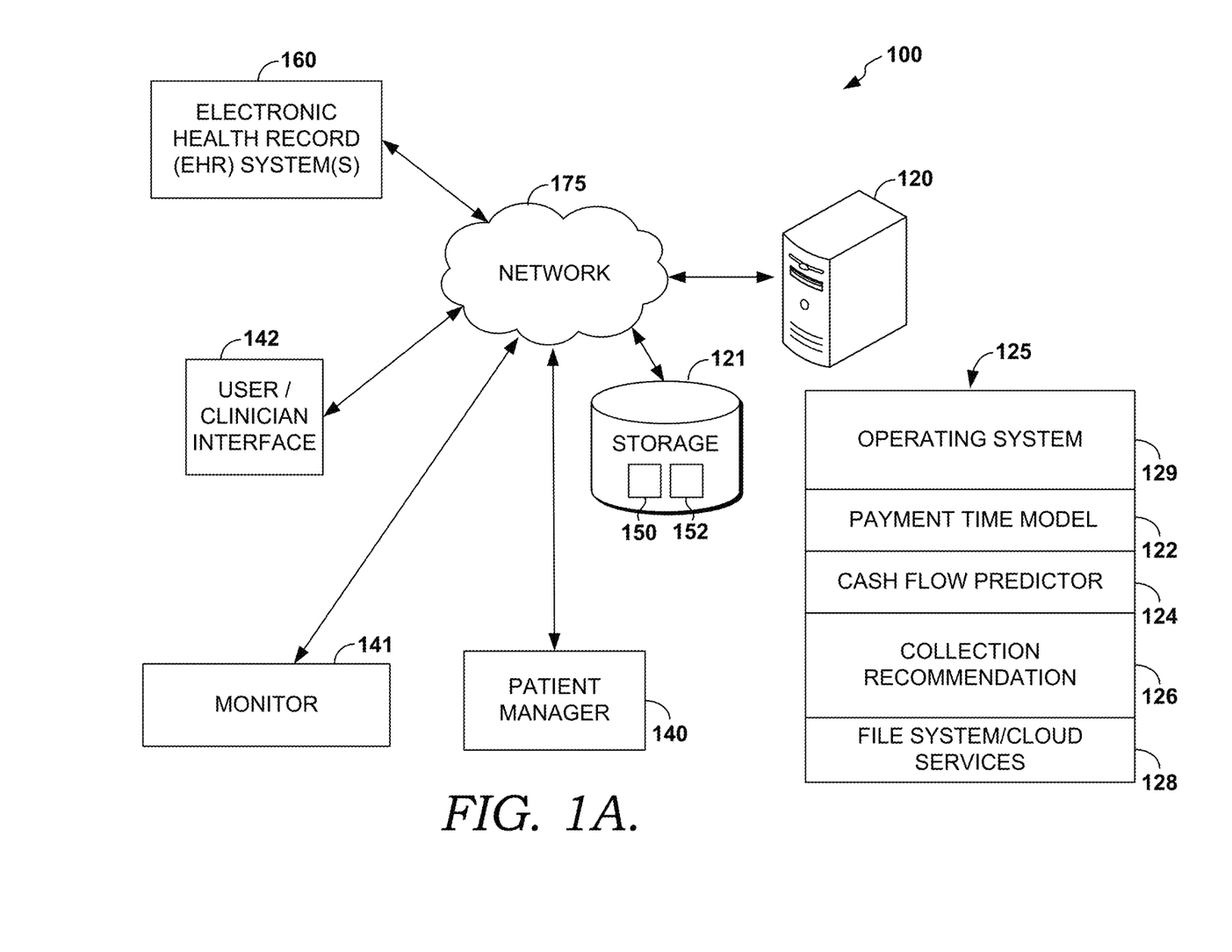
FIGS. 1A and 1B depict aspects of an illustrative operating environment suitable for practicing an embodiment of the disclosure.

Referring now to the drawings in generally and, more specifically, referring to FIG. 1A, an aspect of an operating environment 100 is provided suitable for practicing an embodiment of this disclosure. Certain items in block-diagram form are shown more for being able to reference something consistent with the nature of a patent than to imply that a certain component is or is not part of a certain device. Similarly, although some items are depicted in the singular form, plural items are contemplated as well (e.g., what is shown as one data store might really be multiple data-stores distributed across multiple locations). But showing every variation of each item might obscure aspects of the invention. Thus for readability, items are shown and referenced in the singular (while fully contemplating, where applicable, the plural).

As shown in FIG. 1A, example operating environment 100 provides an aspect of a computerized system for estimating payment probability. Environment 100 includes one or more electronic health record (EHR) systems, such as hospital EHR system 160, communicatively coupled to network 175, which is communicatively coupled to computer system 120. In some embodiments, components of environment 100 that are shown as distinct components may be embodied as part of or within other components of environment 100. For example, EHR systems 160 may comprise one or more EHR systems, such as hospital EHR systems, health information exchange EHR systems, ambulatory clinic EHR systems, psychiatry/neurology EHR systems. Such EHR systems may be implemented in computer system 120. Similarly, EHR system 160 may perform functions for two or more of the EHR systems (not shown). Data may be mined from the EHR system and correlated with invoice data to generate survival curves for different types of clinical procedures and outcomes. Alternatively, this information may be taken from the billing system.

Network 175 may comprise the Internet, and/or one or more public networks, private networks, other communications networks such as a cellular network, or similar network for facilitating communication among devices connected through the network. In some embodiments, network 175 may be determined based on factors such as the source and destination of the information communicated over network 175, the path between the source and destination, or the nature of the information. For example, intra-organization or internal communication may use a private network or virtual private network (VPN). Moreover, in some embodiments, items shown as being communicatively coupled to network 175 may be directly communicatively coupled to other items shown communicatively coupled to network 175.

In some embodiments, operating environment 100 may include a firewall (not shown) between a first component and network 175. In such embodiments, the firewall may reside on a second component located between the first component and network 175, such as on a server (not shown), or reside on another component within network 175, or may reside on or as part of the first component.

Embodiments of EHR system 160 include one or more data stores of health records, which may be stored on storage 121, and may further include one or more computers or servers that facilitate the storing and retrieval of health records. In some embodiments, EHR system 160 may be implemented as a cloud-based platform or may be distributed across multiple physical locations. EHR system 160 may further include record systems that store real-time or near real-time patient (or user) information, such as wearable, bedside, or in-home patient monitors, for example. Although FIG. 1A depicts an exemplary EHR system 160, it is contemplated that an embodiment relies on user/patient manager 140 and/or monitor 141 for storing and retrieving patient record information, such as information acquired from monitor 141.

Example operating environment 100 further includes a provider user/clinician interface 142 communicatively coupled through network 175 to EHR system 160. Although environment 100 depicts an indirect communicative coupling between user/clinician interface 142 and EHR system 160 through network 175, it is contemplated that an embodiment of user/clinician interface 142 is communicatively coupled to EHR system 160 directly. An embodiment of user/clinician interface 142 takes the form of a user interface operated by a software application or set of applications on a client computing device, such as a personal computer, laptop, smartphone, or tablet computing device. In an embodiment, the application includes the PowerChart® software manufactured by Cerner Corporation. In an embodiment, the application is a Web-based application or applet.

Example operating environment 100 further includes computer system 120, which may take the form of a server, which is communicatively coupled through network 175 to EHR system 160, and storage 121.

Computer system 120 comprises one or more processors operable to receive instructions and process them accordingly and may be embodied as a single computing device or multiple computing devices communicatively coupled to each other. In one embodiment, processing actions performed by computer system 120 are distributed among multiple locations such as one or more local clients and one or more remote servers and may be distributed across the other components of example operating environment 100. For example, a portion of computer system 120 may be embodied on monitor 141 or patient manager 140 for performing signal conditioning of the measured patient variable(s). In one embodiment, computer system 120 comprises one or more computing devices, such as a server, desktop computer, laptop, or tablet, cloud-computing device or distributed computing architecture, a portable computing device such as a laptop, tablet, ultra-mobile P.C., or a mobile phone.

Embodiments of computer system 120 include computer software stack 125, which, in some embodiments, operates in the cloud, as a distributed system on a virtualization layer within computer system 120, and includes operating system 129. Operating system 129 may be implemented as a platform in the cloud and is capable of hosting a number of services such as services 122, 124, 126, and 128, described further herein. Some embodiments of operating system 129 comprise a distributed adaptive agent operating system. Embodiments of services 122, 124, 126, and 128 run as a local or distributed stack in the cloud, on one or more personal computers or servers such as computer system 120, and/or a computing device running interface 140 and/or patient manager 142. In some embodiments, user/clinician interface 142 operates in conjunction with software stack 125.

In embodiments, payment time model 122 provide services that facilitate generation of payment probability curves using survival analysis, such as is described with reference to FIG. 2. The cash flow predictor 124 can estimate a cash flow for outstanding invoices using the payment probability curves. The collection recommendation engine can build tranches of unpaid invoices according to payment probability. Collection efforts can then be focused on invoices that are most at risk.

In some embodiments, stack 125 includes file system or cloud-services 128. Some embodiments of file system/cloud-services 128 may comprise an Apache Hadoop and Hbase framework or similar frameworks operable for providing a distributed file system and which, in some embodiments, provide access to cloud-based services such as those provided by Cerner HealtheIntent®. Additionally, some embodiments of file system/cloud-services 128 or stack 125 may comprise one or more stream processing services (not shown). For example, such stream processing services may be embodied using IBM InfoSphere stream processing platform, Twitter Storm stream processing, Ptolemy or Kepler stream processing software, or similar complex event processing (CEP) platforms, frameworks, or services, which may include the use of multiple such stream processing services (in parallel, serially, or operating independently). Some embodiments of the invention also may be used in conjunction with Cerner Millennium®, Cerner CareAware® (including CareAware iBus®), Cerner CareCompass®, or similar products and services.

Example operating environment 100 also includes storage 121 (or data store 121), which, in some embodiments, includes a record of paid invoices 150 and a record of outstanding (e.g., unpaid) invoices 151. The data store 121 can be accessed to generate survival curves from historical data. The data store can also be accessed to triage collection efforts and estimate cash flows from unpaid invoices.

Figure 1B:
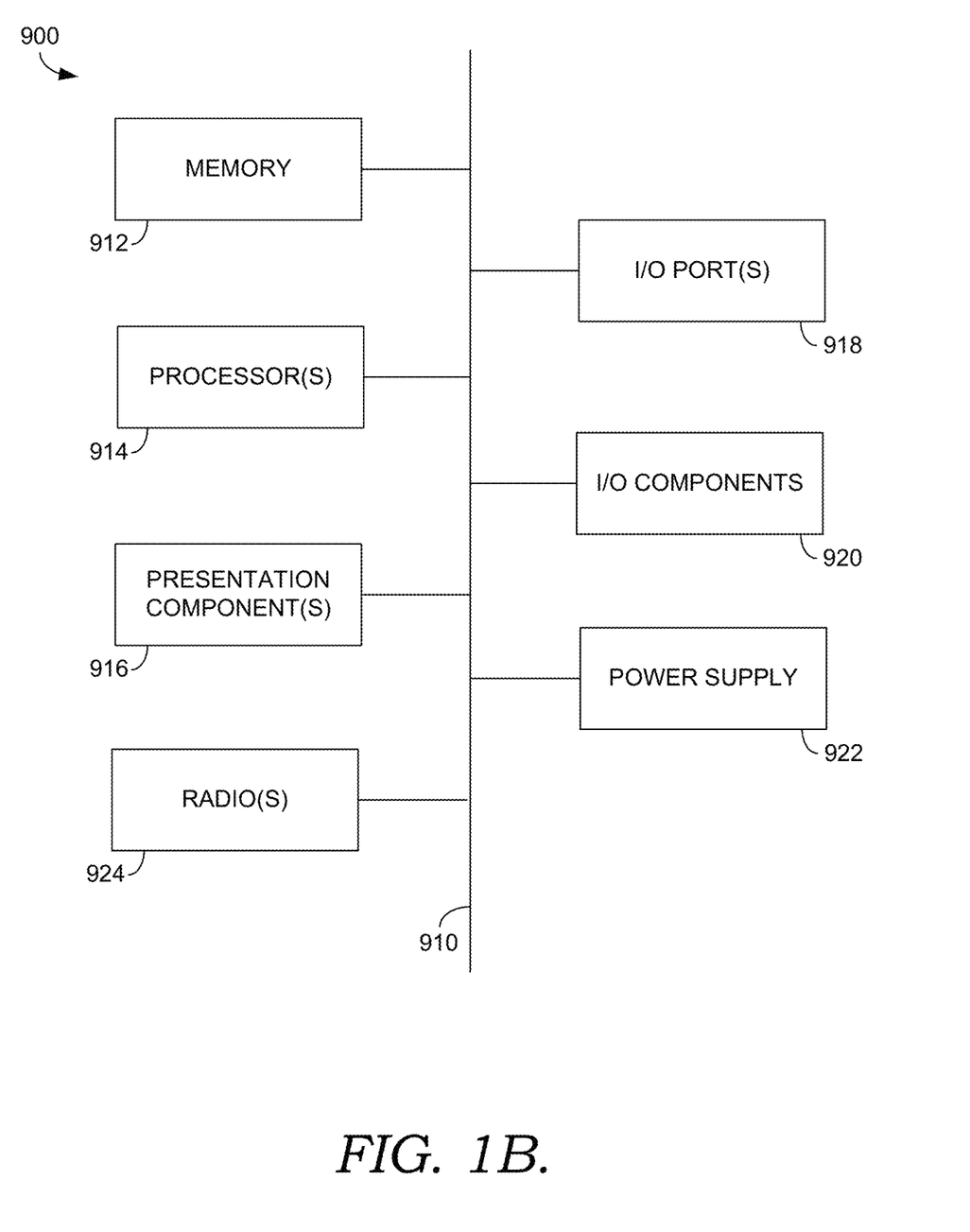

Turning briefly to FIG. 1B, there is shown one example embodiment of computing system 900 representative of a system architecture that is suitable for computer systems such as computer system 120. Computing device 900 includes a bus 910 that directly or indirectly couples the following devices: memory 912, one or more processors 914, one or more presentation components 916, input/output (I/O) ports 918, input/output components 920, radio 924, and an illustrative power supply 922. Bus 910 represents what may be one or more busses (such as an address bus, data bus, or combination thereof). Although the various blocks of FIG. 1A are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. As such, the diagram of FIG. 1A is merely illustrative of an exemplary computing system that can be used in connection with one or more embodiments of the present invention. Distinction is not made between such categories as "workstation," "server," "laptop," "hand-held device," etc., as all are contemplated within the scope of FIG. 1A and reference to "computing system."

Computing system 900 typically includes a variety of computer-readable media. Computer-readable media can be any available media that can be accessed by computing system 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing system 900 includes one or more processors that read data from various entities such as memory 912 or I/O components 920. Presentation component(s) 916 present data indications to a user or other device. Exemplary presentation components include a display device, speaker, printing component, vibrating component, etc.

In some embodiments, computing system 924 comprises radio(s) 924 that facilitates communication with a wireless-telecommunications network. Illustrative wireless telecommunications technologies include CDMA, GPRS, TDMA, GSM, and the like. Radio 924 may additionally or alternatively facilitate other types of wireless communications including Wi-Fi, WiMAX, LTE, or other VoIP communications. As can be appreciated, in various embodiments, radio 924 can be configured to support multiple technologies and/or multiple radios can be utilized to support multiple technologies.

I/O ports 918 allow computing system 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing system 900. The computing system 900 may be equipped with depth cameras, such as stereoscopic camera systems, infrared camera systems, RGB camera systems, touchscreen technology, and combinations of these, for gesture detection and recognition. Additionally, the computing system 900 may be equipped with accelerometers or gyroscopes that enable detection of motion.

The architecture depicted in FIG. 1B is provided as one example of any number of suitable computer architectures, such as computing architectures that support local, distributed, or cloud-based software platforms, and are suitable for supporting computer system 120.

Returning to FIG. 1A, in some embodiments, computer system 120 is a computing system made up of one or more computing devices. In some embodiments, computer system 120 includes one or more software agents and, in an embodiment includes an adaptive multi-agent operating system, but it will be appreciated that computer system 120 may also take the form of an adaptive single agent system or a non-agent system. Computer system 120 may be a distributed computing system, a data processing system, a centralized computing system, a single computer such as a desktop or laptop computer or a networked computing system.

Figure 2:
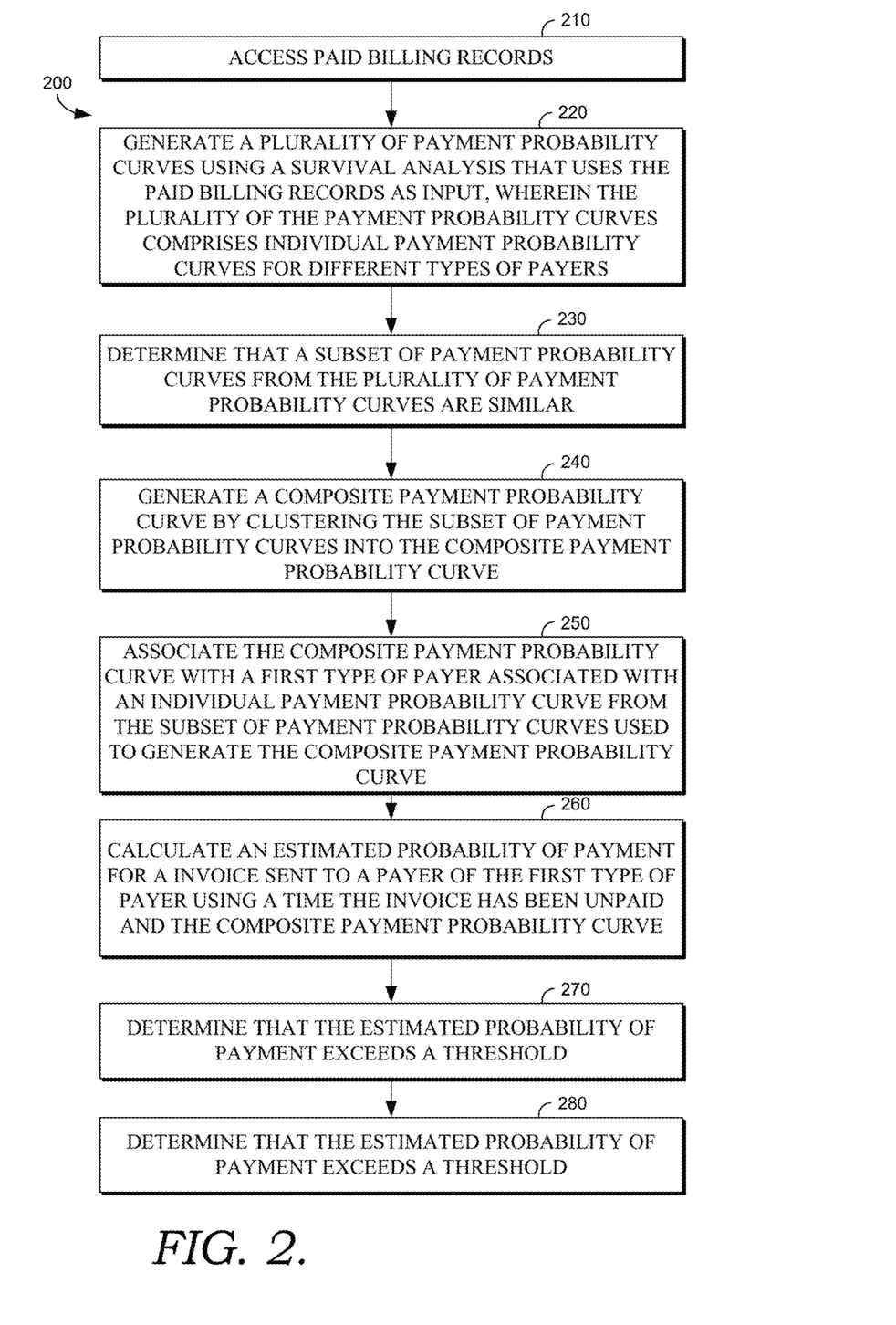
FIG. 2 depicts a flow diagram of a method of forecasting when clinical account receivables will be paid, in accordance with an embodiment of the disclosure.

Turning now to FIG. 2, a flowchart showing a method 200 of forecasting when a clinical invoice will be paid is provided, according to an aspect of the technology described herein.

At step 210, paid billing records are accessed for a clinical entity, such as a doctor's office, hospital, healthcare network, and such. The paid billing records can include details about invoices for payment issued by the clinical entity. The details can include a payer of each invoice, the date the invoice was issued, the date the payment was received, the amount paid, and details about the clinical procedure for which payment was sought, among other possible details.

At step 220, a plurality of payment probability curves are generated using a survival analysis that uses the paid billing records as input. The plurality of the payment probability curves comprises individual payment probability curves for different types of payers. Survival analysis is a branch of statistical modeling used to estimate the probability of an event occurring by a specified date. In the present analysis, the event is payment of a medical invoice. The probability can be determined from a survival curve. In one aspect, the survival curves can be a Kaplan-Meier curve, which is a non-parametric statistic used to estimate the survival function from lifetime data. In medical research, it is often used to measure the fraction of patients living for a certain amount of time after treatment.

The Kaplan-Meier estimator can be given as:

$$\hat{S}(t) = \prod_{i:t_i \leq t} \left(1 - \frac{d_i}{n_i}\right)$$

Where S(t) is the probability of survival (unpaid invoice) at time t, which is the time elapsed from the date an invoice is issued to the point of evaluation i. $n_i$ is the number of unpaid invoices at time i and $d_i$ is the number of payments made at time i. The output of the estimator can be expressed as a curve. The Kaplan-Meier estimator is able to use censored data, which is commonly present in payment data. Censored data can take the form of unpaid invoices, for example, invoices that are not paid within the period analyzed are effectively censored (rightward censoring). They will count as part of $n_i$, but will not be counted as part of $d_i$ because the payment occurs at an $t_i$ outside the studied time frame. This use of censored data may prevent the estimator from reaching 100%. Censored data can also be in the middle of a time frame when an agreement is reached to not pay an invoice for some reason.

As an example, at $t_i$ equals one week, the data may show that 100 invoices have been issued at t=0 (the start of the studied range) and 5 invoices have been paid by t=one week. In this case, S(t) will equal 1−5/100 or 0.95. This can also be expressed as a 5% probability of payment.

The Kaplan-Meier estimator is a step function that builds on the previous survival probability S(Ti−1). To show how this works consider an example where the data shows ti equals two weeks. Assume that the S(t) calculation is weekly, so the calculation above was the previous step calculation. The data shows that 95 invoices had been outstanding at t−1 (week one) and 10 more invoices have been paid during the second week, t=two weeks. In this case, the survival probability is S(t−1)*(1−10/95) or 0.95*0.89=0.85. So, at two weeks the probability of survival is 85%. Conversely, the probability of payment is 15%.

In one aspect, curves are calculated for a large number and combination of clinical conditions. For example, a curve could be calculated for different payers and/or classes of payers, such as auto insurance, health insurance, Medicare, Medicaid, private payers, etc. Curves can be calculated for different types of procedures, such as inpatient, outpatient, and emergency procedures. Combination curves can include curves for a specific payer and single procedure type.

At step 230, a subset of payment probability curves from the plurality of payment probability curves are determined to be similar. The similarity can be evaluated using sequence mining to cluster self-similar time series or balancing the difference between a reference curve ("deltas") and among individual curves ("epsilons").

At step 240, a composite payment probability curve is generated by clustering the subset of payment probability curves into the composite payment probability curve.

At step 250, the composite payment probability curve is associated with a first type of payer associated with an individual payment probability curve from the subset of payment probability curves used to generate the composite payment probability curve. For example, the composite curve could be formed by combining a curve for a first payer, a curve for a second payer, and a curve for inpatient procedures across multiple payers. In this case, the first payer, second payer, and inpatient procedures apart from a payer are all associated with the same composite curve.

At step 260, an estimated probability of payment for an invoice sent to a payer of the first type of payer is calculated using a time the invoice has been unpaid and the composite payment probability curve. In other words, the payment probability calculated for an invoice outstanding for the same time as the invoice being evaluated can be determined from the composite curve.

At step 270, the estimated probability of payment is determined to exceed a threshold. The threshold could be expressed as an age or a percentage of payment likelihood since the two are related. For example, the threshold could be eight weeks or 90% likelihood of payment. These could be effectively the same point on the graph. 90% and eight weeks are just examples and are not meant to be limiting. The threshold could be sent based on available collection resources. For example, if the collection capacity of a clinical facility is 200 efforts per week, then the threshold could be set to the 200 invoices most likely to have already been paid. The 200 could be taken from several invoices groups with different graphs. Calculating a probability of payment for different types of invoices using different graphs allows the resources to be allocated more efficiently. In contrast, if a composite graph is used for all outstanding invoices, then just the oldest invoices will receive follow up.

At step 280, the invoice is designated for a collection effort because it exceeds the threshold.

Figure 3:
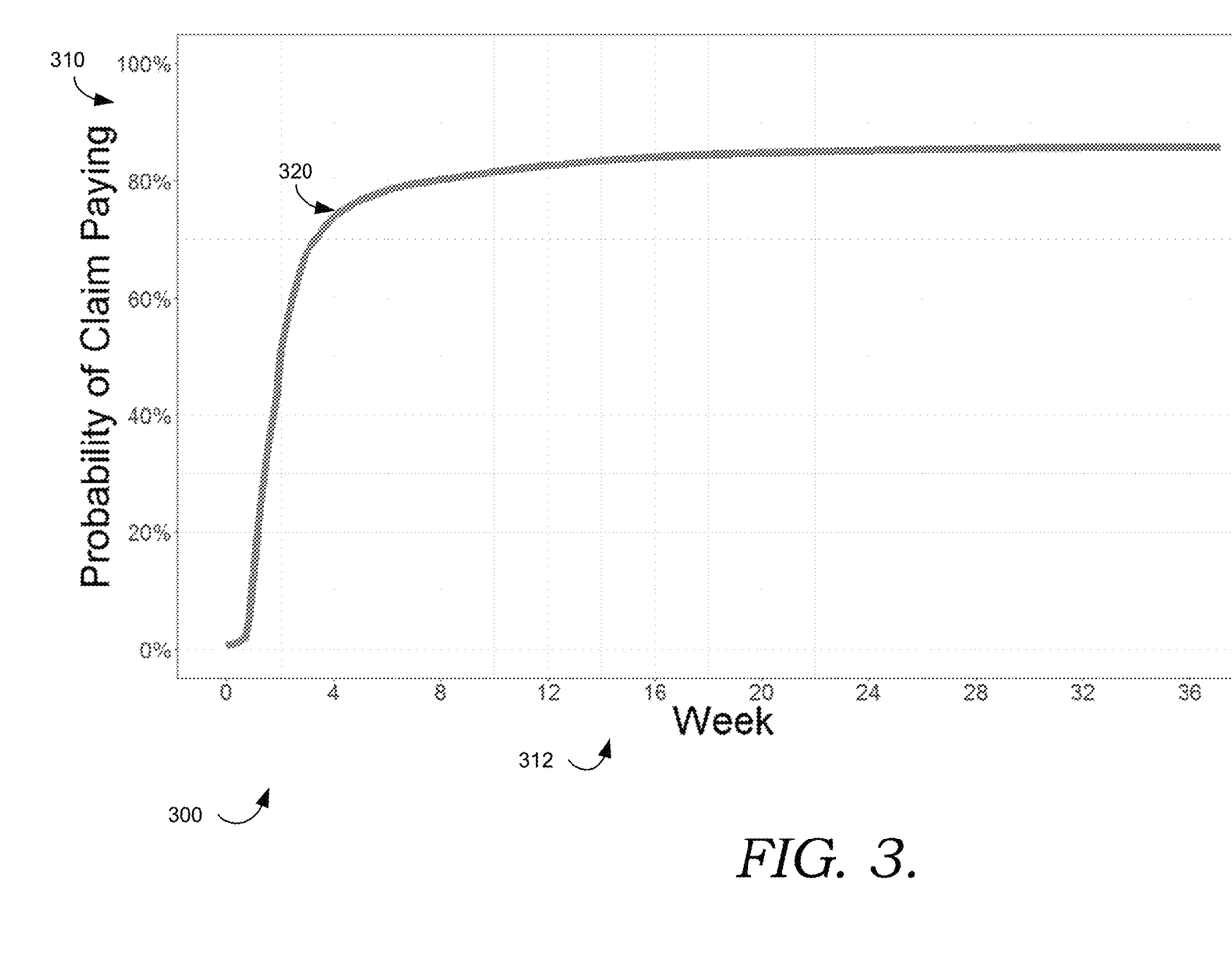
FIG. 3 depicts a graphical illustration of a probability of payment occurring by a specified time for all payers, in accordance with an embodiment of the disclosure.

Turning now to FIG. 3, a payment probability curve 320 generated through a survival analysis of historical invoice payment data is shown, according to an aspect of the technology described herein. The payment probability graph 300 shows the probability of an invoice being paid versus time. The y-axis 310 shows the probability that the invoice is paid measured by percentages ranging from 0% to 100%. The x-axis 312 shows how the percentage changes over time as measured by weeks. The invoice is communicated to the payer at week zero. The probability of any given invoice being paid increase with time.

The payment probability curve 320 is an average of all payments received. However, as will be shown subsequently, the curve for different payers can be quite different making the use of a generic curve less accurate. Even within the same payer, factors like the type of procedure can make a significant difference.

Figure 4:
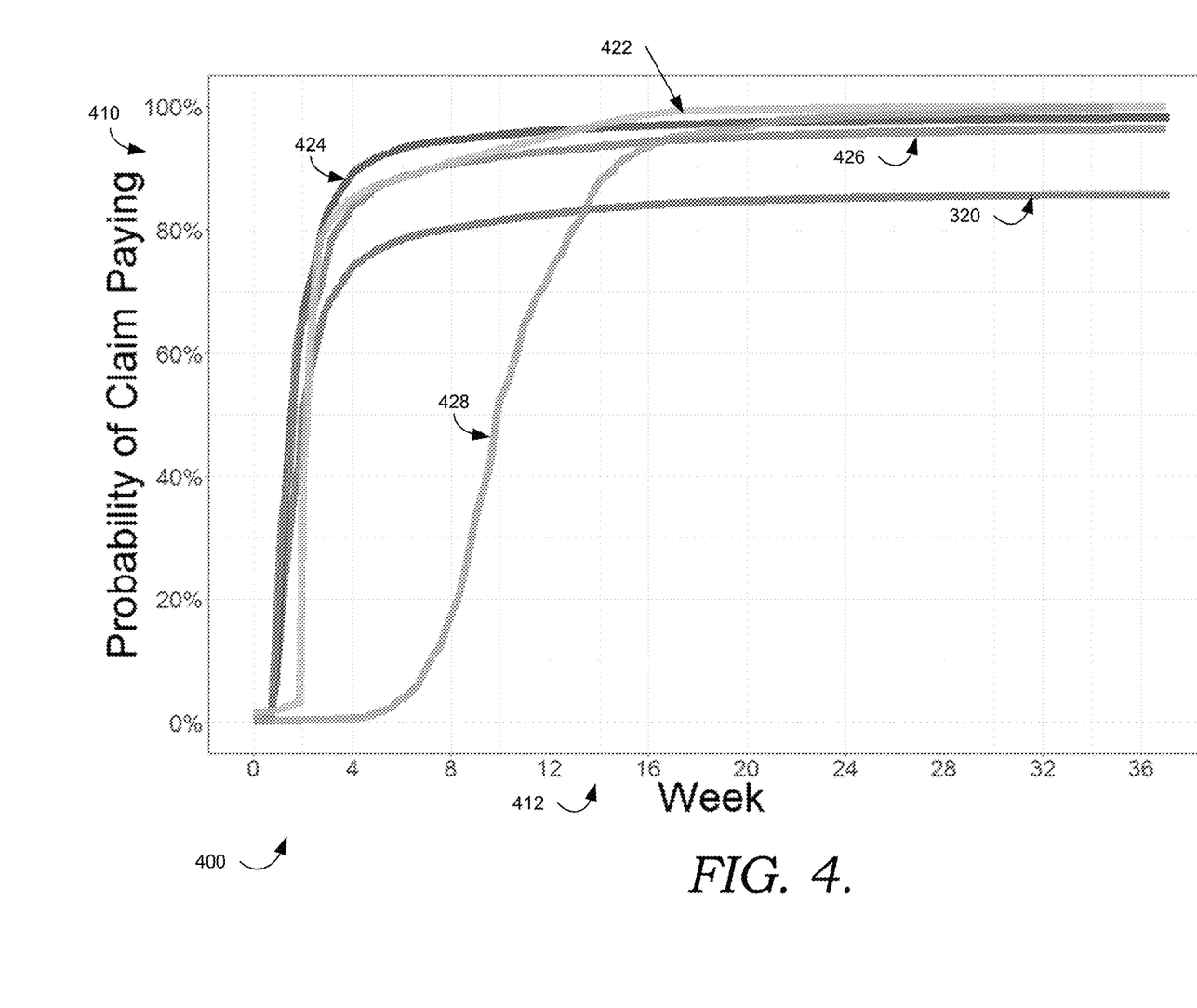
FIG. 4 depicts a graphical illustration of a probability of payment occurring by a specified time for five different payers, in accordance with an embodiment of the disclosure.

Turning now to FIG. 4, a graph 400 showing payment probability curves generated through a survival analysis of historical invoice payment data is shown, according to an aspect of the technology described herein. The payment probability graph 400 shows the probability of an invoice being paid versus time. The y-axis 410 shows the probability the invoice is paid measured by percentages ranging from 0% to 100%. The x-axis 412 shows how the percentage changes over time as measured by weeks. The invoice is communicated to the payer at week zero. The probability of any given invoice being paid increase with time.

The composite curve 320 from FIG. 3 is shown. As can be seen the composite curve 320 differs significantly from the other curves, which are generated for a single payer. The first payer curve 422, the second payer curve 424, the third payer curve 426, and the forth payer curve 428 all differ. The payer could be an individual payer, such as a single health insurance company or a class of payers, such as all private individuals. Typically, individuals would not have enough payment history to generate a meaningful curve, so data from private individuals can be combined to form a curve for the class.

Figure 5:
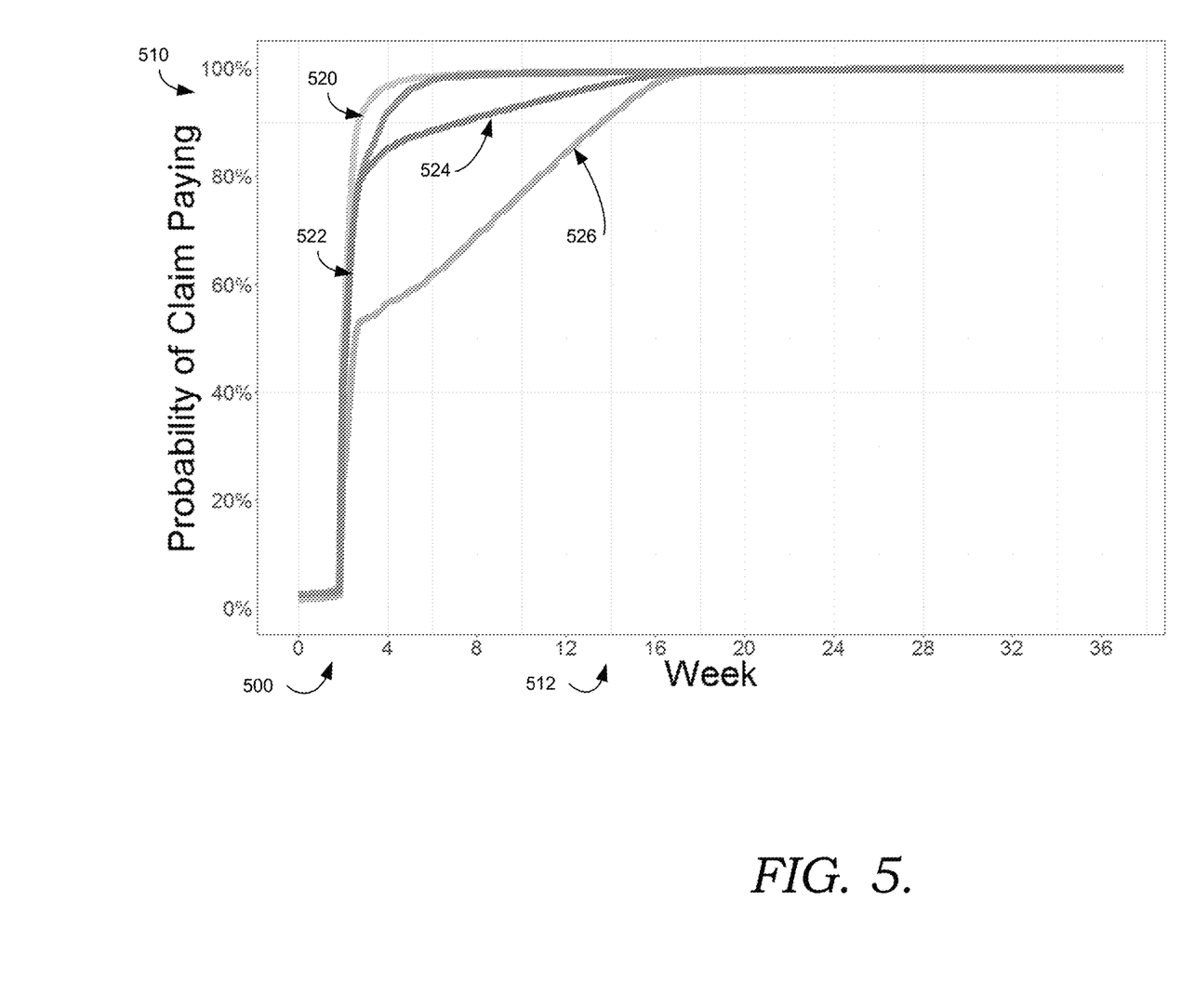
FIG. 5 depicts a graphical illustration of a probability of payment occurring by a specified time for different types of clinical events, in accordance with an embodiment of the disclosure.

Turning now to FIG. 5, a graph 500 showing payment probability curves generated through a survival analysis of historical invoice payment data is shown, according to an aspect of the technology described herein. The payment probability graph 500 shows the probability of an invoice being paid versus time. The y-axis 510 shows the probability the invoice is paid measured by percentages ranging from 0% to 100%. The x-axis 512 shows how the percentage changes over time as measured by weeks. The invoice is communicated to the payer at week zero. The probability of any given invoice being paid increase with time.

The curves shown in FIG. 5 represent payments by the same payer, but for inpatient, outpatient, and emergency procedures. The inpatient curve 526, the outpatient curve 520, the emergency curve 522, and the payer composite curve 524 all differ. For example, this graph shows that inpatient invoices are less likely to be paid through week four to week twelve than invoices of a different class at the same time. Invoice types can have different payment times, making the usability of a general curve 320 questionable.

Figure 6:
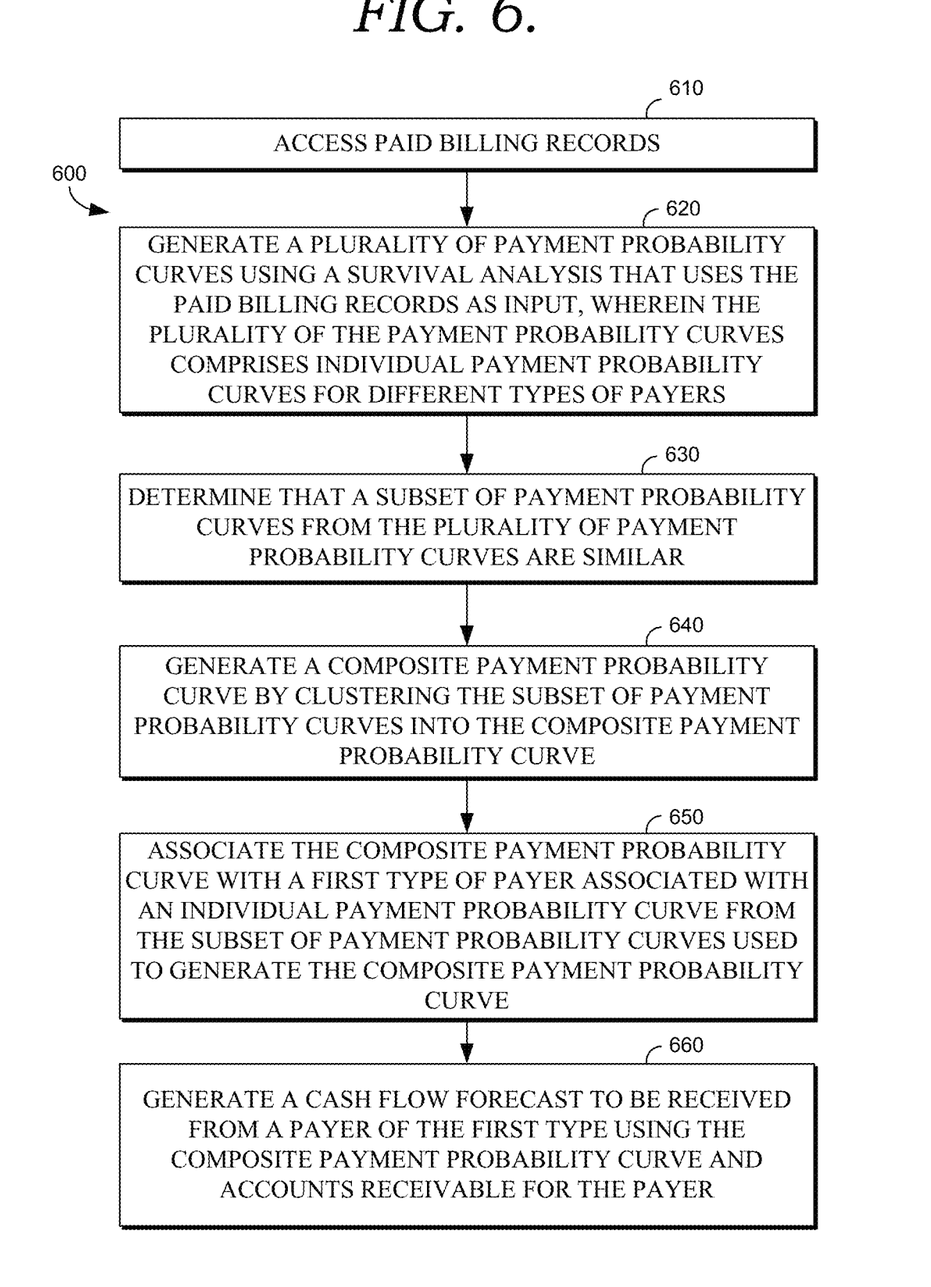
FIG. 6 depicts a flow diagram of a method of forecasting when clinical account receivables will be paid, in accordance with an embodiment of the disclosure.

Turning now to FIG. 6, a flowchart showing a method 600 of forecasting when a clinical invoice will be paid is provided, according to an aspect of the technology described herein.

At step 610, paid billing records are accessed for a clinical entity, such as a doctor's office, hospital, healthcare network, and such. The paid billing records can include details about invoices for payment issued by the clinical entity. The details can include a payer of each invoice, the date the invoice was issued, the date the payment was received, the amount paid, and details about the clinical procedure for which payment was sought, among other possible details.

At step 620, a plurality of payment probability curves are generated using a survival analysis that uses the paid billing records as input. The plurality of the payment probability curves comprises individual payment probability curves for different types of payers.

At step 630, a subset of payment probability curves from the plurality of payment probability curves are determined to be similar. The similarity can be evaluated using sequence mining to cluster self-similar time series or balancing the difference between a reference curve ("deltas") and among individual curves ("epsilons").

At step 640, a composite payment probability curve is generated by clustering the subset of payment probability curves into the composite payment probability curve.

At step 650, the composite payment probability curve is associated with a first type of payer associated with an individual payment probability curve from the subset of payment probability curves used to generate the composite payment probability curve.

At step 660, generating a cash flow forecast to be received from a payer of the first type using the composite payment probability curve and accounts receivable for the payer. For claims that have yet to pay, projections are made on median conditional expectations based on the payment probability curve.

Figure 7:
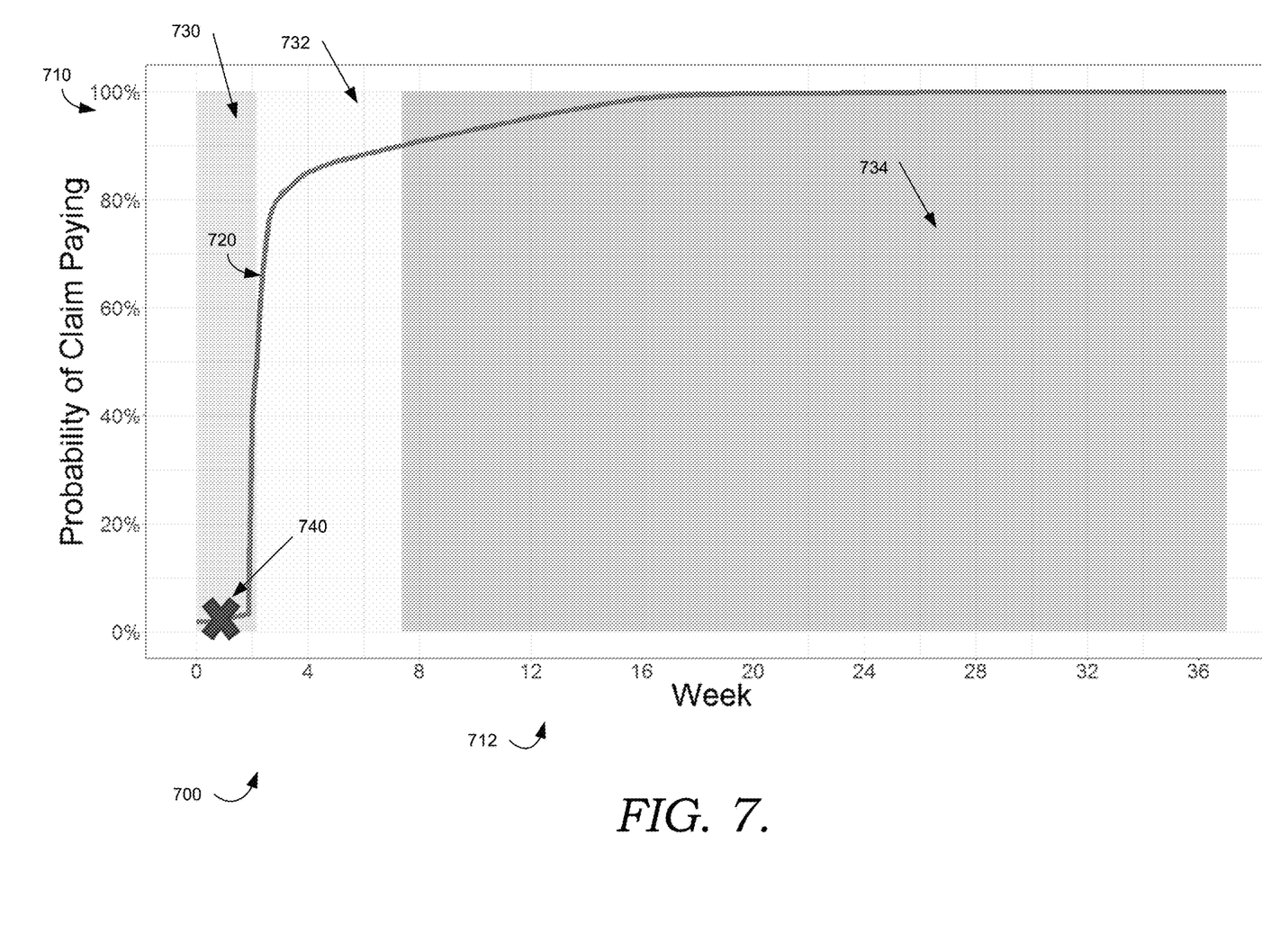
FIG. 7 depicts depict graphical illustrations of outstanding invoice tranches with an invoice in the low probability payment tranche, in accordance with an embodiment of the disclosure.

Turning now to FIG. 7, a graph 700 having a payment probability curve generated through a survival analysis of historical invoice payment data is shown, according to an aspect of the technology described herein. The payment probability graph 700 shows the probability of an invoice being paid versus time. The y-axis 710 shows the probability the invoice is paid measured by percentages ranging from 0% to 100%. The x-axis 712 shows how the percentage changes over time as measured by weeks. The invoice is communicated to the payer at week zero. The probability of any given invoice being paid increase with time. The payment probability curve 720 is a composite curve generated by treating points forming similar curves as time series and then clustering them into similar groups to form a new composite curve.

The graph 700 is divided into three tranches or groups. The graph is generated from historical data and can be used to show how likely an unpaid invoice is to be paid. The low probability tranche 730 represents a period from zero to two weeks where any given invoice has a low probability of being paid. For the purposes of collection efforts, this means that there is no reason to be concerned about an unpaid invoice, such as invoice 740, in the low probability tranche. Invoice 740 can be fit to the graph using the age of the invoice. In this case, invoice 740 is about one week old and has a low payment probability. In other words, not being paid is the most likely state for an invoice in the low probability tranche. The medium probability tranche 732 represents a period from two to eight weeks during which the payment probability increases sharply. The high probability tranche 734 represents invoices that have a comparatively high probability that they should have already been paid.

Figure 8:
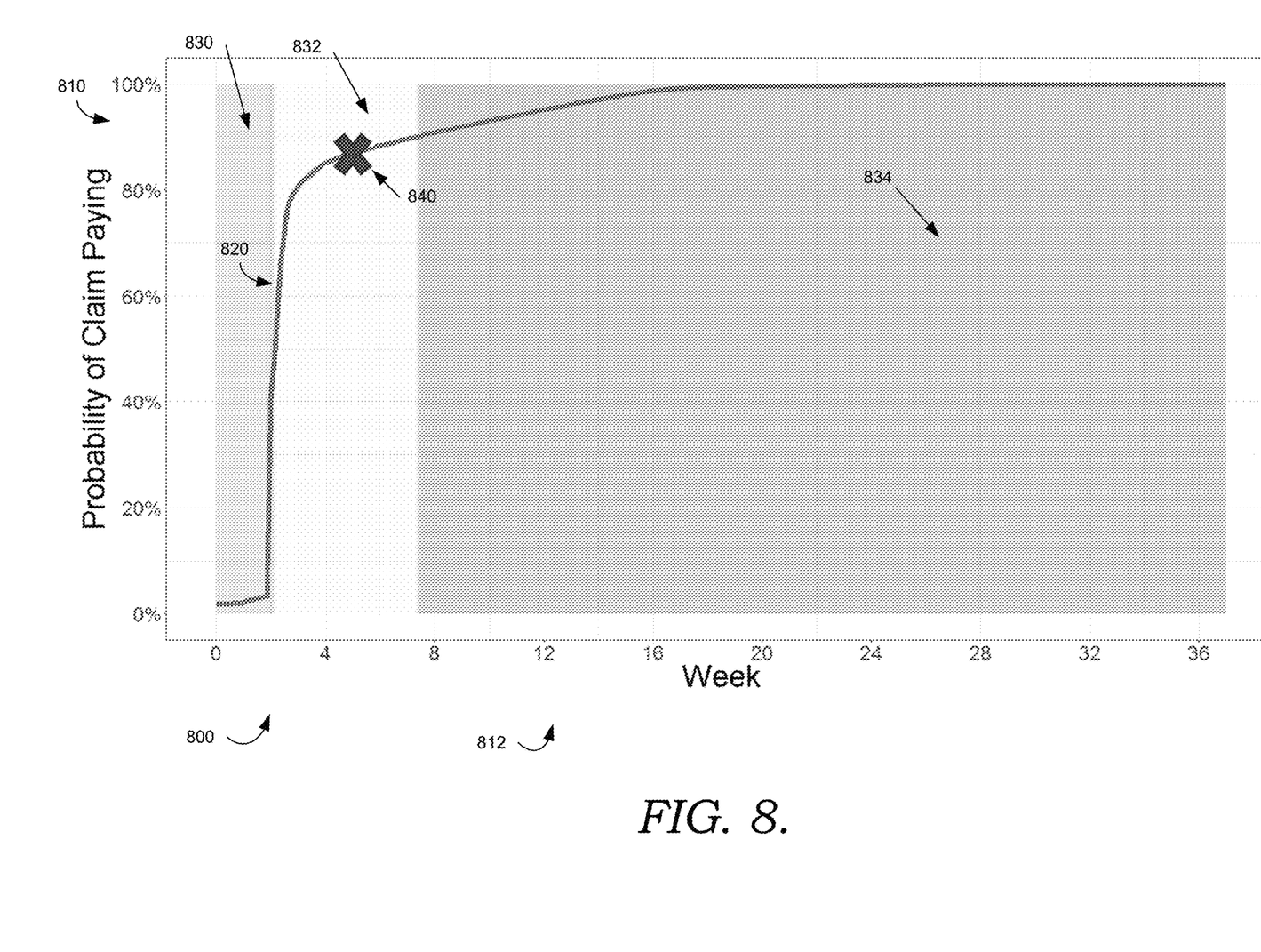
FIG. 8 depicts depict graphical illustrations of outstanding invoice tranches with an invoice in the low probability payment tranche, in accordance with an embodiment of the disclosure.

Invoices, such as 840 on FIG. 8, are increasing likely to be paid. Invoice 840 can be fitted to curve 720 using the age of the invoice 840. As can be seen, invoice 840 has an 85% probability of having been paid. Another way to say it is that, 85% of invoices having the same characteristics as invoice 840 have already been paid. This may indicate a problem requiring follow up.

Figure 9:
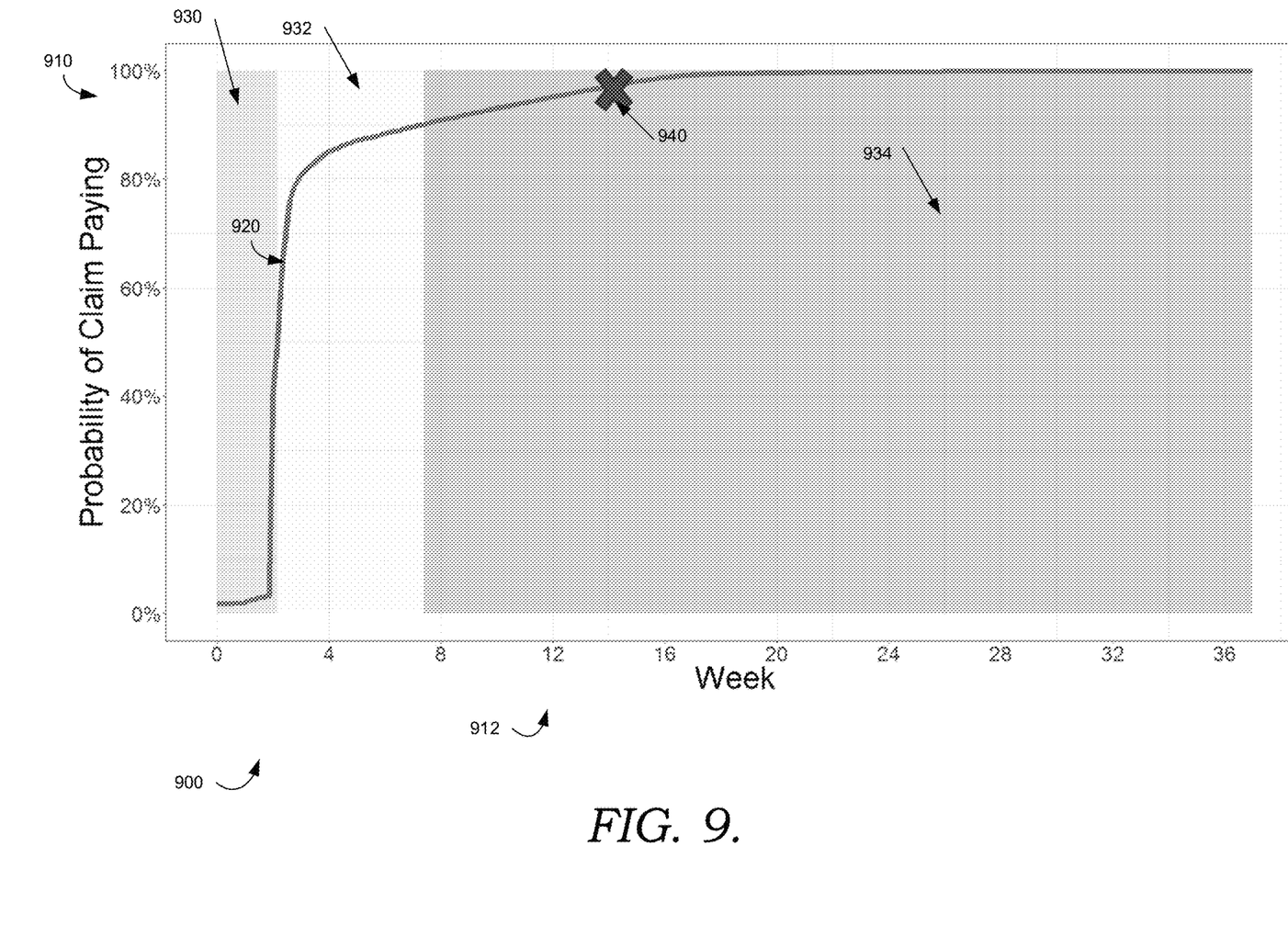
FIG. 9 depicts depict graphical illustrations of outstanding invoice tranches with an invoice in the low probability payment tranche, in accordance with an embodiment of the disclosure.

Invoices, such as 940 on FIG. 9, should have been paid. Invoice 940 can be fitted to curve 720 using the age of the invoice 940. As can be seen, invoice 940 has a 95% probability of having been paid. Another way to say it is that, 95% of invoices having the same characteristics as invoice 940 have already been paid. This is a strong indication that something is wrong.

Figure 10:
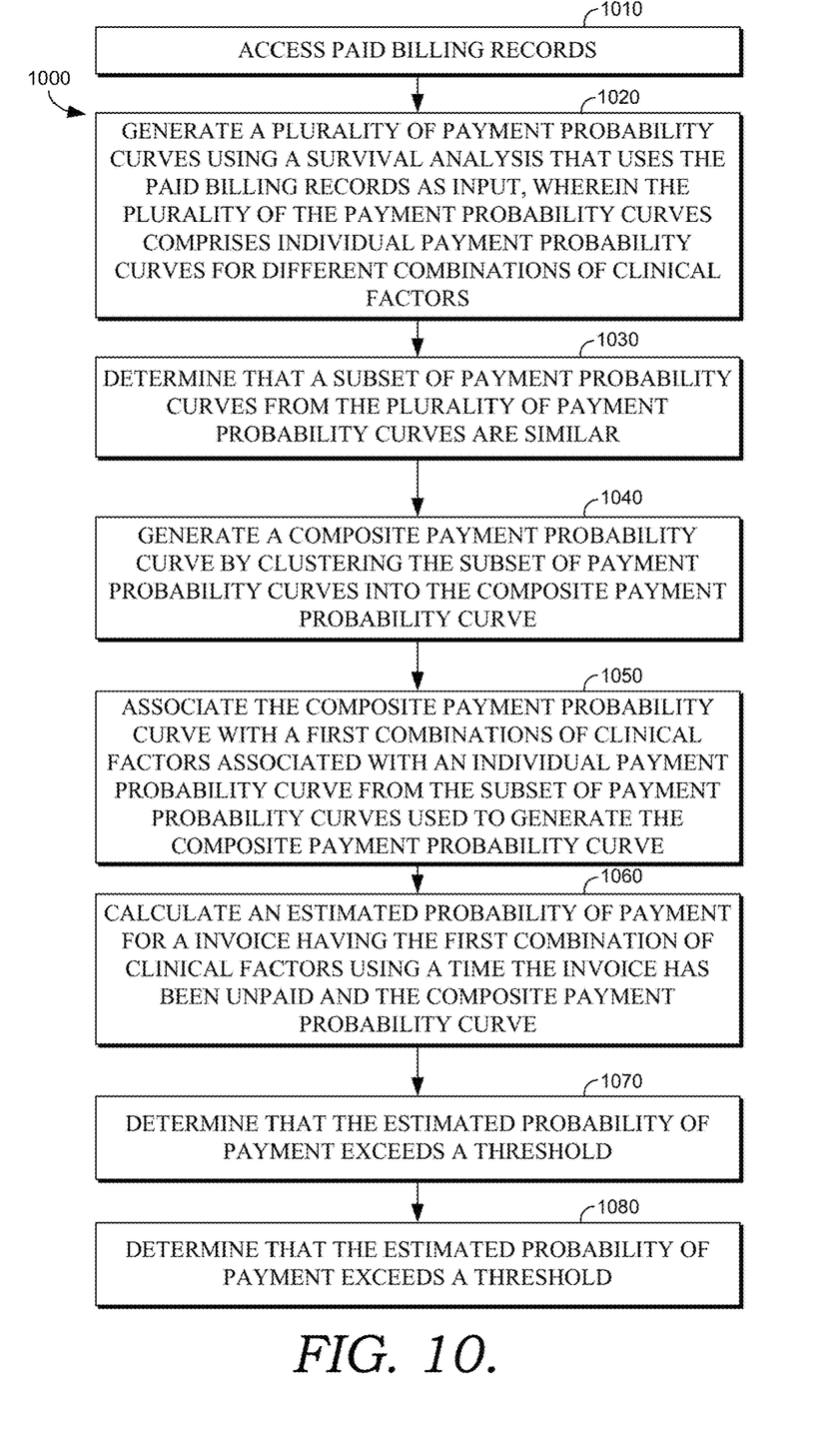
FIG. 10 depicts a flow diagram of a method of forecasting when clinical account receivables will be paid, in accordance with an embodiment of the disclosure.

Turning now to FIG. 10, a flowchart showing a method 1000 of forecasting when a clinical invoice will be paid is provided, according to an aspect of the technology described herein.

At step 1010, paid billing records are accessed for a clinical entity, such as a doctor's office, hospital, healthcare network, and such. The paid billing records can include details about invoices for payment issued by the clinical entity. The details can include a payer of each invoice, the date the invoice was issued, the date the payment was received, the amount paid, and details about the clinical procedure for which payment was sought, among other possible details.

At step 1020, a plurality of payment probability curves are generated using a survival analysis that uses the paid billing records as input. The plurality of the payment probability curves comprises individual payment probability curves for different combinations of clinical factors.

At step 1030, a subset of payment probability curves from the plurality of payment probability curves are determined to be similar. The similarity can be evaluated using sequence mining to cluster self-similar time series or balancing the difference between a reference curve ("deltas") and among individual curves ("epsilons").

At step 1040, a composite payment probability curve is generated by clustering the subset of payment probability curves into the composite payment probability curve.

At step 1050, the composite payment probability curve is associated with a first combination of clinical factors associated with an individual payment probability curve from the subset of payment probability curves used to generate the composite payment probability curve.

At step 1060, an estimated probability of payment for an invoice having the first combination of clinical factors is calculated using a time the invoice has been unpaid and the composite payment probability curve.

At step 1070, the estimated probability of payment is determined to exceed a threshold.

At step 1080, the invoice is designated for a collection effort.

It will be understood that certain features and subcombinations are of utility and may be employed without reference to other features and subcombinations and are contemplated within the scope of the invoices. Not all steps listed in the various figures need be carried out in the specific order described. Accordingly, the scope of the invention is intended to be limited only by the following invoices.

What is claimed is:

1. Computer-readable media having computer-executable instructions embodied thereon that when executed, provide an estimate of when clinical invoices will be paid, the method comprising:
   accessing paid billing records that comprise clinical procedure information received over a computer network from an electronic health record;
   generating a plurality of payment probability curves using a survival analysis that uses the paid billing records as input, wherein the plurality of the payment probability curves comprises individual payment probability curves for different types of payers, and wherein the plurality of the payment probability curves comprises individual payment probability curves for different types of clinical procedures, and wherein an individual payment probability curve in the plurality of payment probability curves is not able to accurately predict future payments;
   determining that a subset of payment probability curves from the plurality of payment probability curves are similar;
   generating a composite payment probability curve by clustering the subset of payment probability curves into the composite payment probability curve;
   associating the composite payment probability curve with a first type of payer associated with an individual payment probability curve from the subset of payment probability curves used to generate the composite payment probability curve;
   calculating an estimated probability of payment for an invoice sent to a payer of the first type of payer using a time the invoice has been unpaid and the composite payment probability curve;
   determining that the estimated probability of payment exceeds a threshold;
   and designating the invoice for a collection effort.

2. The media of claim 1, wherein the different types of clinical procedures are selected from the group consisting of out-patient procedures, in-patient procedures, and emergency procedures.

3. The media of claim 1, wherein the plurality of the payment probability curves comprises individual payment probability curves for different types of clinical procedures paid for by different types of payers.

4. The media of claim 1, wherein the first type of payer is a private person.

5. The media of claim 1, wherein the first type of payer is a health insurance company.

6. The media of claim 1, wherein the threshold is 80%.

7. A method for forecasting when clinical invoices will be paid, the system comprising:
   accessing paid billing records that comprise clinical procedure information received over a computer network from an electronic health record;
   generating a plurality of payment probability curves using a survival analysis that uses the paid billing records as input, wherein the plurality of the payment probability curves comprises individual payment probability curves for different types of payers, and wherein the plurality of the payment probability curves comprises individual payment probability curves for different billed amounts, and wherein an individual payment probability curve in the plurality of payment probability curves is not able to accurately predict future payments;

determining that a subset of payment probability curves from the plurality of payment probability curves are similar;

generating a composite payment probability curve by clustering the subset of payment probability curves into the composite payment probability curve;

associating the composite payment probability curve with a first type of payer associated with an individual payment probability curve from the subset of payment probability curves used to generate the composite payment probability curve; and generating a cash flow forecast to be received from a payer of the first type using the composite payment probability curve and accounts receivable for the payer.

8. The method of claim 7, wherein the plurality of the payment probability curves comprises individual payment probability curves for different types of clinical procedures.

9. The method of claim 8, wherein the different types of clinical procedures are selected from the group consisting of out-patient procedures, in-patient procedures, and emergency procedures.

10. The method of claim 7, wherein the plurality of the payment probability curves comprises individual payment probability curves for different types of clinical procedures paid for by different types of payers.

11. The method of claim 7, wherein the first type of payer is selected from a group consisting of a private person, a health insurance company, a casualty insurance company, and a government agency.

12. The method of claim 7, wherein the cash flow forecast is based on median conditional expectations based on the composite payment probability curve.

13. A method for forecasting when clinical invoices will be paid, the method comprising:

accessing paid billing records that comprise clinical factor information received over a computer network from an electronic health record;

generating a plurality of payment probability curves using a survival analysis that uses the paid billing records as input, wherein the plurality of the payment probability curves comprises individual payment probability curves for different combinations of clinical factors, wherein the first combination of clinical factors comprises a payer class and a clinical procedure type, and wherein an individual payment probability curve in the plurality of payment probability curves is not able to accurately predict future payments;

determining that a subset of payment probability curves from the plurality of payment probability curves are similar;

generating a composite payment probability curve by clustering the subset of payment probability curves into the composite payment probability curve;

associating the composite payment probability curve with a first combination of clinical factors associated with an individual payment probability curve from the subset of payment probability curves used to generate the composite payment probability curve;

calculating an estimated probability of payment for an invoice having the first combination of clinical factors using a time the invoice has been unpaid and the composite payment probability curve;

determining that the estimated probability of payment exceeds a threshold; and designating the invoice for a collection effort.

14. The method of claim 13, wherein the payer class is selected from a group consisting of a private person, a health insurance company, a casualty insurance company, and a government agency.

15. The method of claim 13, wherein the first combination of clinical factors comprises a payer class and a billed amount.

16. The method of claim 13, wherein the first combination of clinical factors comprises a payer class and a clinical service provided.

* * * * *

UNITED STATES PATENT AND TRADEMARK OFFICE
CERTIFICATE OF CORRECTION

PATENT NO. : 11,379,931 B2
APPLICATION NO. : 15/896296
DATED : July 5, 2022
INVENTOR(S) : Sasanka Are, John Matthew Sugden and Brian Thurston Page 1 of 1

It is certified that error appears in the above-identified patent and that said Letters Patent is hereby corrected as shown below:

In the Specification

Column 1,
Line 8, Delete "Jan. 29, 2017," and insert -- Dec. 29, 2017, --.

Column 8,
Line 14, Delete "ti" and insert -- $t_i$ --.

Signed and Sealed this
Second Day of January, 2024

Katherine Kelly Vidal
*Director of the United States Patent and Trademark Office*